United States Patent [19]

Behrens et al.

[11] Patent Number: 4,528,573

[45] Date of Patent: Jul. 9, 1985

[54] OPTICAL PRINT HEAD WITH REMOVABLE MOUNTING

[75] Inventors: Herbert Behrens, Zetal; Rainer Marx, Wilhelmshaven; Jürgen Schmitt, Stadtland, all of Fed. Rep. of Germany

[73] Assignee: Olympia Werke AG, Wilhelmshaven, Fed. Rep. of Germany

[21] Appl. No.: 592,458

[22] Filed: Mar. 21, 1984

[30] Foreign Application Priority Data

Mar. 22, 1983 [DE] Fed. Rep. of Germany ....... 3310259

[51] Int. Cl.³ ........................ G01D 9/42; G01D 15/14

[52] U.S. Cl. .................................... 346/108; 346/160; 354/4; 355/1

[58] Field of Search ............... 346/108, 107 R, 139 R, 346/160; 354/4, 5; 355/1

[56] References Cited

U.S. PATENT DOCUMENTS

| | | | |
|---|---|---|---|
| 2,982,175 | 5/1961 | Eisler | 354/5 |
| 4,008,954 | 2/1977 | Ogawa | 355/1 |
| 4,364,064 | 12/1982 | Baues | 346/107 R |

FOREIGN PATENT DOCUMENTS

| | | |
|---|---|---|
| 2557254 | 6/1977 | Fed. Rep. of Germany . |
| 2606596 | 8/1977 | Fed. Rep. of Germany . |
| 2812206 | 10/1979 | Fed. Rep. of Germany . |

*Primary Examiner*—E. A. Goldberg
*Assistant Examiner*—Mark Reinhart
*Attorney, Agent, or Firm*—Spencer & Frank

[57] ABSTRACT

An optical printing head for recording graphic and text information line by line, including a plurality of juxtaposed, actuatable optical components, including picture dot elements, from which light is transmitted in dots by means of objective lenses along the length of a line to be recorded on a photosensitive record carrier, and cross-section converters for conducting light from a light source to the light switching components. To simplify and reduce the cost of the installation of the light switching components and associated light coupling elements (which in known printing heads were mounted and adjusted separately), the light switching components or elements are disposed on a common carrier which is provided with an abutment surface for aligning the light switching elements in the direction of the line, and with a contact surface for the cross section converters used such that, after installation, the cross-section converters will always be perpendicular to the light array of the light switching component. The arrangement permits simple installation of the light switching elements on a carrier in a manner such that each light switching element is automatically disposed exactly opposite the illuminated light conductive fiber forming the associated cross sectional converter.

23 Claims, 7 Drawing Figures

OPTICAL PRINT HEAD WITH REMOVABLE MOUNTING

BACKGROUND OF THE INVENTION

The present invention relates to an optical printing head, including an arrangement of light switching elements, of the type employed in parallel printers for the line-by-line recording of picture and text information. More particularly, the present invention relates to an improved optical printing head of the above described type wherein a plurality of juxtaposed light switching elements receive light by means of cross section converters which are in communication with a light source, and the light switching elements can be actuated such that the light is transmitted in dots by means of objective lenses along the length of a line to be recorded on a photosensitive record carrier.

Data processing systems require fast printers to convert electrical input signals into visible displays that can be easily read in a print-out. For this purpose, printers equipped with optical printing heads have been used with success. For example, an optical printing device including a photosensitive record carrier, photopaper or an intermediate record carrier and an electrically controllable optical component having picture dot elements for blocking the flow of light or permitting it to pass is disclosed in German Offenlegungsschrift [laid-open patent application] No. 2,557,254, published June 30, 1977.

An optical printer having a magnetically controllable optical component is disclosed in German Offenlegungsschrift No. 2,812,206, published Oct. 4, 1979. It is based on an integrated light modulation matrix which requires neither the deflection of a light beam nor electrostatic charges for the actual printing process. Such an integrated light modulation matrix is disclosed in German Offenlegungsschrift No. 2,606,596, published Aug. 25, 1977.

The operation of that matrix is based on light modulation by means of magneto-optical storage layers, such as, for example, iron garnet layers. Such layers include a uniform arrangement of light switching elements which are switched purely electronically by means of vapor-deposited layers of conductor paths and resistors. With high integration density, it is possible to construct line-by-line switching, light switching components including more than one thousand elements. These light switching elements are disposed between a constant light source and a photosensitive record carrier and can be controlled by a character generator in such a manner that the light constantly radiated by the light source can be blocked or passed as required at the locations of predetermined character raster dots.

In order to be able to form a single straight print line on the photosensitive surface, a plurality of light switching elements which are arranged in a row transversely to the direction in which the record carrier is transported, are required. Below the light switching elements, and between these elements and the record carrier, which may for example, be a photoconductive drum, an optical system is provided which serves to image the light switching elements on the record carrier.

To obtain a precisely aligned printed line on the record carrier without visible transitions between images of the individual switching elements, adjustment must be possible. For this purpose, one known arrangement adjusts each component composed of one light switching element and one objective lens. Since such a component is relatively large and displacement must remain within very narrow limits, such adjustment is very time-consuming and costly.

Moreover, German patent application No. 3,214,519 corresponding to U.S. application Ser. No. 06/486,937, filed Apr. 20, 1983 by H. Behrens et al., discloses a printer having an optical printing head for the line-by-line recording of graphic and text information, wherein it is proposed to arrange and attach the light switching elements by positioning and fastening an edge of a light switching element body so that it is parallel to the actual switching line. The light switching elements are here inserted individually into the printing head. Their image, however, is adjusted by displacing the objective lenses relative to one another. This arrangement has found acceptance in practice because the light switching elements employed here are provided with a light coupling member made of glass onto which a light coupling plug can be placed without requiring alignment.

SUMMARY OF THE INVENTION

It is the object of the present invention to provide an arrangement of light switching elements with associated means for coupling in light for an optical printing head, which arrangement is easy to install. Such installation should not pose any problems even if the light switching elements are no longer equipped with light coupling rods or have only such rods which require no light coupling plug to be inserted in a self-centering manner.

The above object is achieved according to the present invention by an optical printing head for a parallel printer for the line-by-line recording of graphics and text information in successive parallel lines on a photosensitive record carrier disposed at a print location, which printing head comprises a plurality of juxtaposed actuatable light switching means, each including a light switching array and being disposed adjacent one another in the direction of a recording line, for transmitting incident light in the form of dots along the length of a line to be recorded when actuated, a respective cross section converter for conducting light from a light source to each of said light switching means, and a respective objective lens for each said light switching means to project the dots of light produced by the light switching means onto the record carrier disposed at the printing location along a portion of each printing line; and wherein: a carrier is provided on which the plurality of switching means are mounted and which itself is removably mounted in the printing head; an abutment surface is provided on the carrier with the abutment surface extending in the direction of a line of print; means are provided for causing a portion or edge of each of the light switching elements to abut the abutment surface to align the light switching elements on the carrier in the direction of the line of print; and a contact surface is provided on the carrier for the cross section converters with the contact surface being disposed such that each cross section converter, when in contact with the contact surface, can be placed in a defined position opposite the light switching array of the associated light switching means.

The arrangement according to the present invention permits easy installation of the light switching elements on a common carrier in such a manner that the light switching elements or means are automatically placed exactly opposite the cross section converters, which are designed as light conductive fibers, which are to be illuminated by the light source. This makes subsequent alignment of the light conductive fibers with the light switching elements unnecessary. Moreover, it is simultaneously assured that the light conductive fibers, are placed precisely perpendicular to the light switching arrays.

In order to assure good homogeneity of the light emitted by the cross sectional converters (light conductive fibers) and directed toward the light switching elements, according to preferred embodiments of the invention, either light conducting rods are disposed in the printing head between the end surfaces of the free ends of the cross section converters (or light conductive fibers) and the polarizing filters of the respective light switching elements, or cylindrical lenses and air filled spaces are disposed between the end surfaces of the free ends of the cross section converters and the pole filters.

BRIEF DESCRIPTION OF THE DRAWINGS

The present invention will now be described in greater detail with the aid of a number of embodiments and the figures wherein.

DETAILED DESCRIPTION OF THE PREFERRED EMBODIMENTS

Figure 1:
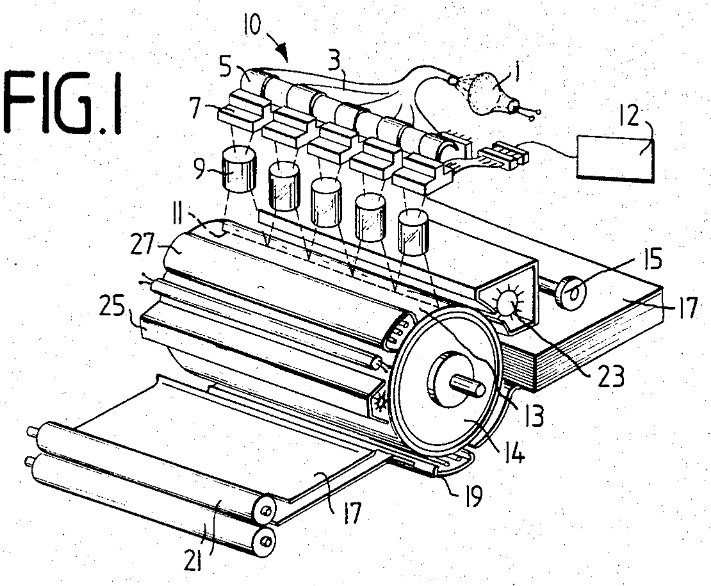
FIG. 1 is a diagrammatic representation of a printer including an optical printing head according to the present invention.

FIG. 1 shows a printer including a light source 1, which may be a halogen lamp, for example, whose light beam is conducted by means of light conductive fibers 3 and cross section converters 5, e.g., flat light conductive fibers, to known light switching elements 7 having picture, or character, dot elements. Objective lenses 9 focus, or reproduce, the dots of light produced by these picture dot elements of light switching elements 7 along the length of a recording line 11 onto a photosensitive record carrier 13 on a drum 14. Light switching elements 7, which serve as actuatable optical components, are actuated, in a known manner, by a character generator 12 in such a manner that the light constantly emitted by light source 1 can be blocked or passed as required at each character dot element, corresponding to a predetermined character raster points. The light switching element 7 are well known in the prior art and are described in the U.S. patent application No. 162,968, June 25, 1980.

In FIG. 1, five light switching elements 7 are shown, with each having, for example, five hundred twelve switchable dots for one whole line. Thus, a complete line of print is associated with twenty-five hundred and sixty (5×512) picture dot elements.

The optical printing head 10, which is comprised of light conductive fibers 3, cross section converters 5, light switching elements 7 and objective lenses 9, thus permits line-by-line recording of graphic and text information on the photosensitive record carrier 13, which information is then electrographically developed and fixed in a known manner. For this purpose, there is provided a developing device 23, a paper intake roller 15 to pull in a sheet of recording medium 17, a transfer station 19 and a fixing device 21 provided with pressure rollers. Additionally, a cleaning device 25 and a charging corona 27 are provided around drum 14. The perpendicular impingement of the optical axes on record carrier 13 is structurally controllable. The remaining minimal error is no longer visible in the lines of text.

Figure 2:
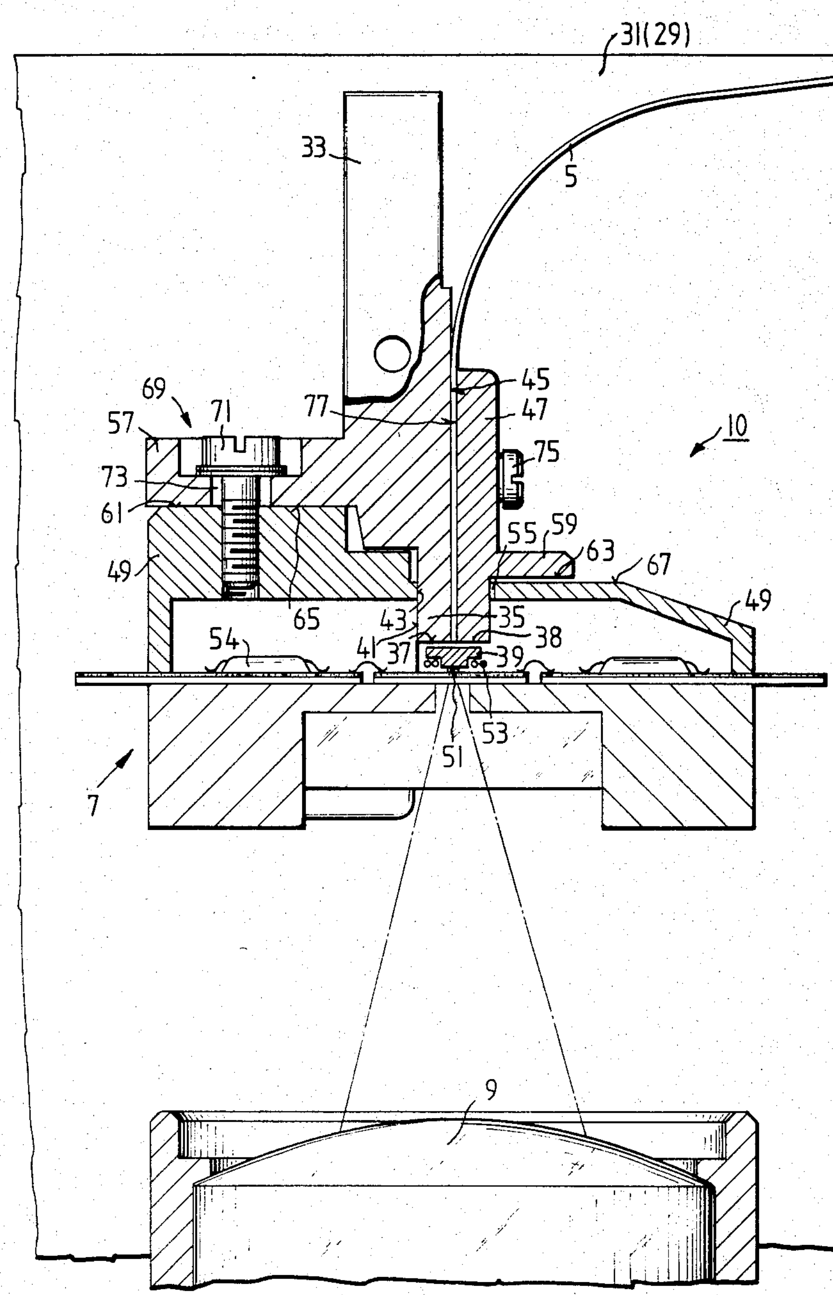
FIG. 2 is a cross sectional detail view through a portion of the printing head of FIG. 1 showing one embodiment of a carrier and light coupling arrangement according to the invention.

As shown in FIG. 2 (and also in FIG. 4), a carrier 33 is fastened by means of screw connections between the side walls 29 and 31 of the optical printing head 10. The carrier 33 has a bar 35 at its underside with this bar 35 projecting in the line direction. The frontal or end surface 37 of this bar 35 is disposed so that it is in close proximity to the polarizing filters 39 of the plurality of light switching elements 7. The side surface 41 adjacent this frontal surface 37 on one side of bar 35 serves as an abutment surface for the abutment edges 43 of light switching elements 7, while the side surface 45 on the other side of bar 35 serves as a contact surface for the cross section converters 5. According to FIG. 2, these cross section converters 5 comprise individual flat light conductive fibers whose free ends are pressed by means of a cover plate 47, which serves as a holding device, against the contact face 45 so that the cross section converters 5 can be fastened to carrier 33.

Each light switching elements 7 is provided with a covering hood 49 for the light switching lines or array 51, magnetic windings 53, IC's 54 and pole filters 39 of an individual element 7. The covering hood 49 is provided with an opening or recess 55 for the passage of the frontal or end surfaces 37 and 38 of the bar 35 and of the cover plate 47 respectively, as well as for the free ends of the cross section converters 5 which are disposed between the cover plate 47 and the contact surface 45. As shown, one edge or side of the recess 55 simultaneously serves as the abutment edge 43 for the light switching elements 7 against abutment surface 41 of carrier 33 so as to align the light switching element 7 in the direction of a line of print. For reliable assembly, carrier 33 and covering plate 47 are provided with respective outwardly extending lateral projections or flanges 57 and 59 which have lower abutment surfaces 61 and 63, respectively. These abutment surfaces 61 and 63 mate with respective counterabutment surfaces 65 and 67 on the covering hoods 49 in such a manner that the respective end surfaces 37 and 38 of the bar 35 and the cover plate 47 and the end surfaces of the cross section converters 5 cannot come into engagement with the polarizing filters 39 of the switching elements 7. This reliably prevents damage to the sensitive components of light switching elements 7.

By means of a respective screw connetion arrangement 69, the abutment surface 61 of the covering hood 49 of each light switching element 7 can be pressed against the counterabutment surface 65 of lateral projection 57 and fastened in place to the projection 57. This screw connection 69 includes a bolt 71 which can be screwed into a bore formed in counterabutment surface 65 of covering hood 49 and which is displaceably mounted in an elongated hole 73 formed in projection 57 so that lateral relative movement between the switching element and the carrier 33 is possible when the bolt 71 is not tightened. Upon alignment of the light switching elements 7 so that the contact edges 43 of the light switching elements 7 lie against the abutment surface 41 of bar 35 and tightening of the bolts 71, the plurality of switching elements 7 are maintained in the desired secure alignment. The covering hoods 49 are themselves firmly connected with the remaining portion of the respective light switching elements 7 by means of a screw or glue connection.

According to FIG. 2, the free ends of the cross section converters 5 are disposed directly opposite the associated polarizing filters 39 at a small distance therefrom and open into the plane defined by frontal faces 37, 38. Moreover, as shown, the cover plate 45 is releasably connected with carrier 33 by means of a plurality of screws or bolts 75, with the free ends of cross section converters 5 being clamped between contact surface 45 of carrier 33 and the inner surface 77 of cover plate 47. After installation and alignment of all five light switching elements 7 on carrier 33, and the clamping of the cross section converters 5 between the cover plate 47 and the surface 45, the clamping by cover plate 47 can be easily partially released, whereupon the individual cross section converter sections 5 can be shifted downwardly until they come to rest on the associated polarizing filters 39 shown in FIG. 2. Thereafter, screws 75 are tightened again to cause the cover plate 47 to securely clamp the cross section converters 5.

Figure 3:
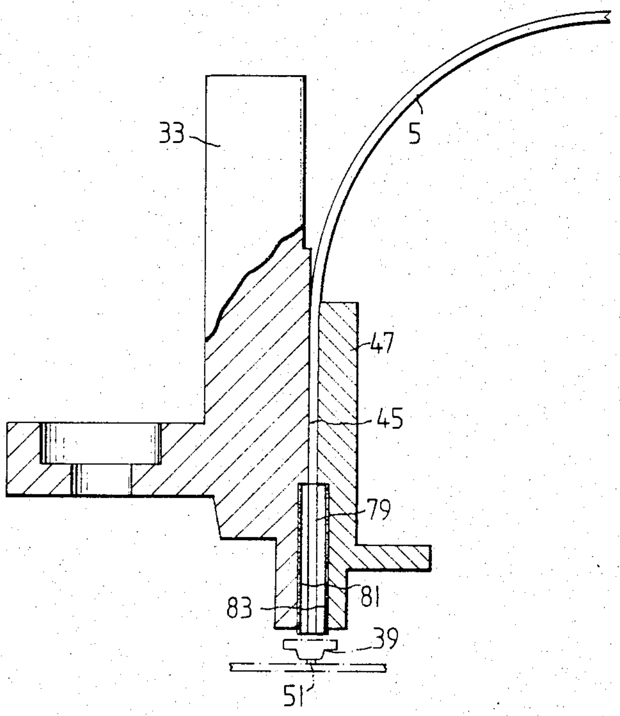
FIG. 3 is a cross sectional view of a modified carrier according to the invention showing a further embodiment of the light coupling arrangement.
Figure 4:
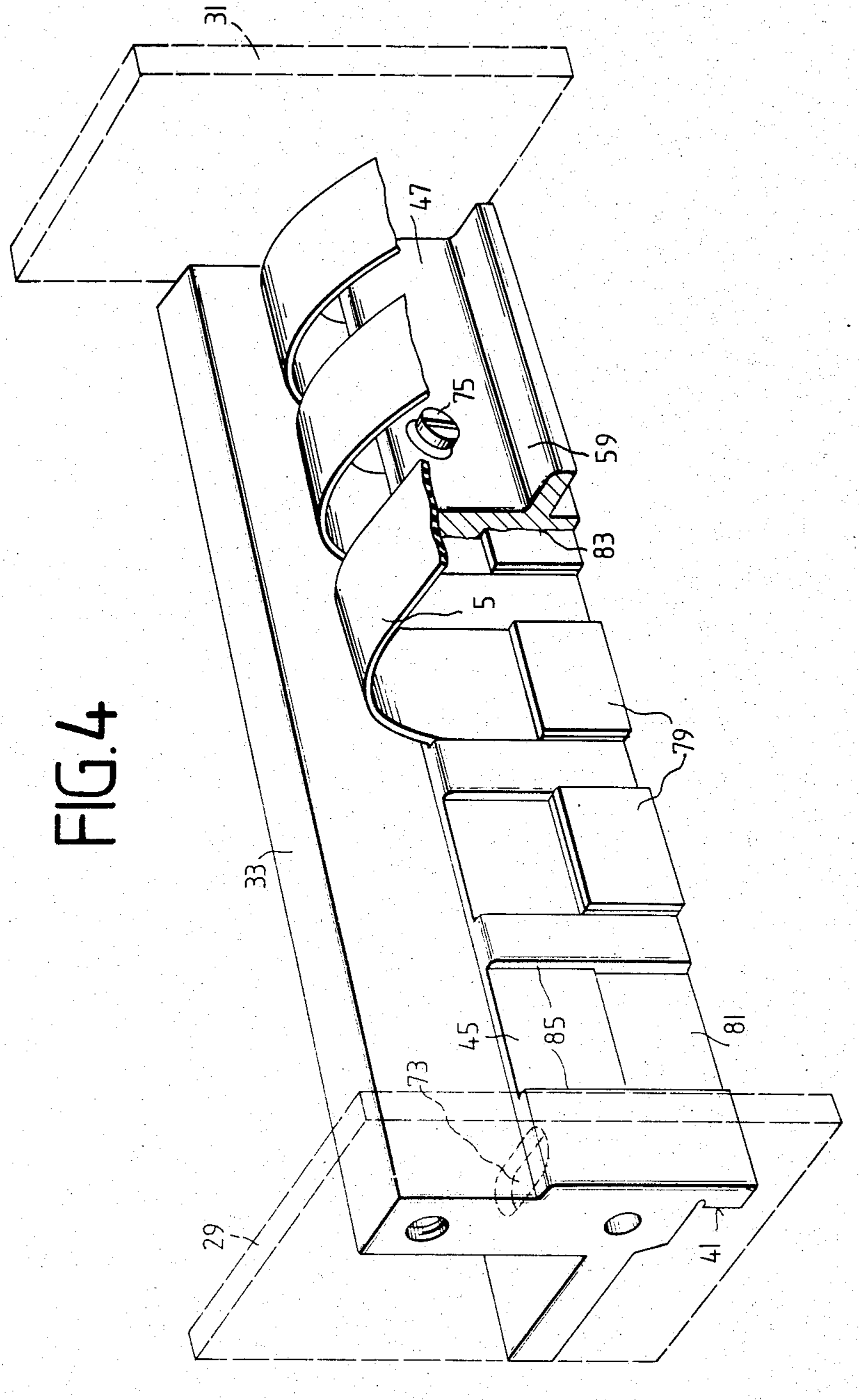
FIG. 4 is an isometric view, partially broken away, of the carrier of FIG. 3.

In the embodiment according to FIGS. 3 and 4, the light switching array 51 and its associated pole filter 39 are not disposed directly opposite the end surface of the associated cross section converter 5. Rather, as shown, a homogenization or light coupling rod 79, which is also mounted on carrier 33, is disposed between the end of the converter 5 and the polarizing filter 39. To mount the rod 79 on the carrier 33, the contact surface 45 of carrier 33 and the interior surface 77 of plate 47 are provided with recesses 81 and 83 respectively which open into the respective end or frontal surfaces 37 and 38. These rods 79, which are made of glass, can be secured on carrier 33 by means of the cover plate 47 or may also be glued in, in which case the light switching elements 7, i.e. the light switching arrays 51, should be adjustable in the line direction with respect to light coupling rods 79.

FIG. 4 shows five cross section converters 5 and five light coupling rods 79 which are not part of the light switching elements 7. In this case, the cross section converters 5 (light conductive fibers) are laterally guided by means of the side edges 85 of the recesses 81 which are provided in the contact surface 45 as well as by corresponding guide recesses 83 in the cover plate 47 which serve as guide chutes for the cross section converters 5.

Figure 5:
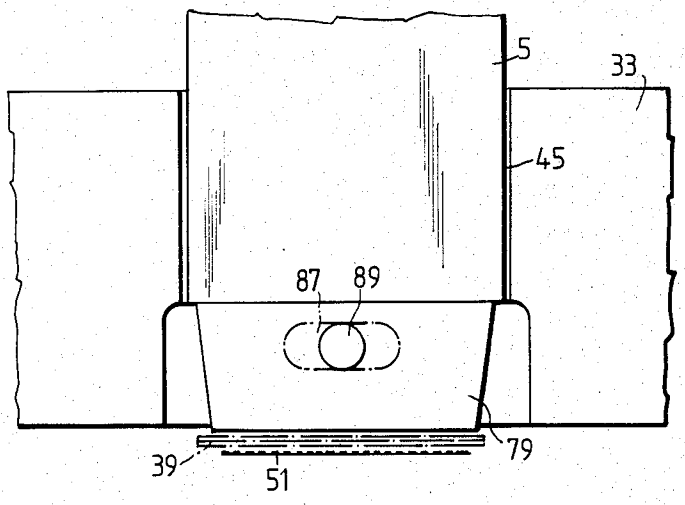
FIG. 5 is a side view of a detail of FIG. 3.

FIG. 5 shows a modification wherein the recesses 81 for light coupling rods 79 are widened in the line direction such that the rods 79 can be adjusted with respect to the light switching elements 7 which are fixed in this direction. For this purpose, cover plate 47 is provided with perforations or slots 87 through which pins 89, which are fastened, for example by glueing, to the light coupling rods 79, project toward the outside in such a manner that an adjustment device (not shown) is able to engage the pins. Cover plate 47, moreover, may be made either in one piece, as shown in FIG. 4, or of separate cover plates associated with individual rods 79.

Figure 6:
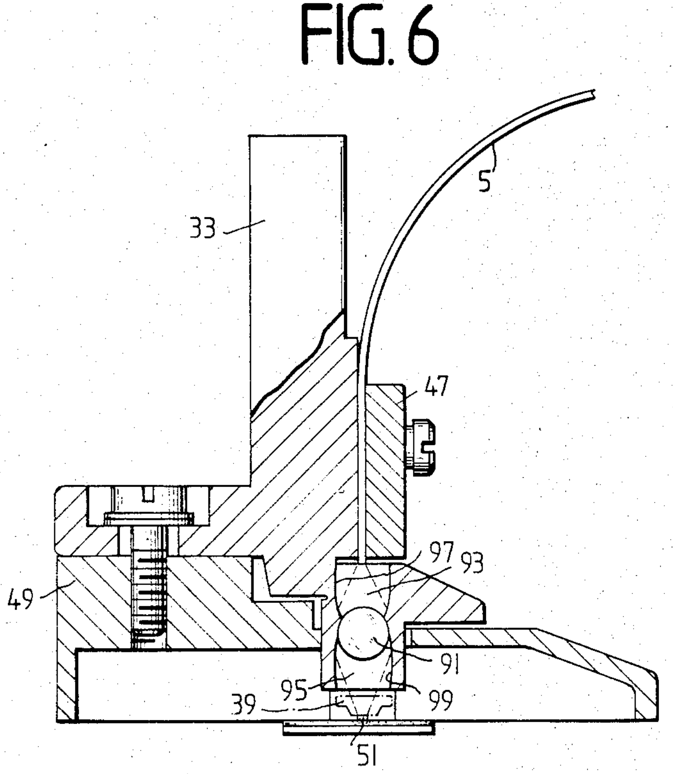
FIG. 6 is a cross sectional view of a modified carrier according to the invention showing another embodiment of the light coupling arrangement.

In the embodiment according to FIG. 6, a cylindrical lens 91 with an air-filled space 93, or 95 on either side is provided between the frontal surface of each cross section converter 5 and the associated light switching array 51 and polarizing filter 39 for homogenizing the available light. The air-filled spaces 93 and 95 may be formed by respective chambers 97 and 99 which have been worked into the facing surfaces of the carrier 33 and the cover plate 47. For the purpose of good light yield, the interior of these chambers 97 and 98 may be covered by mirrors and may be appropriately shaped.

Figure 7:
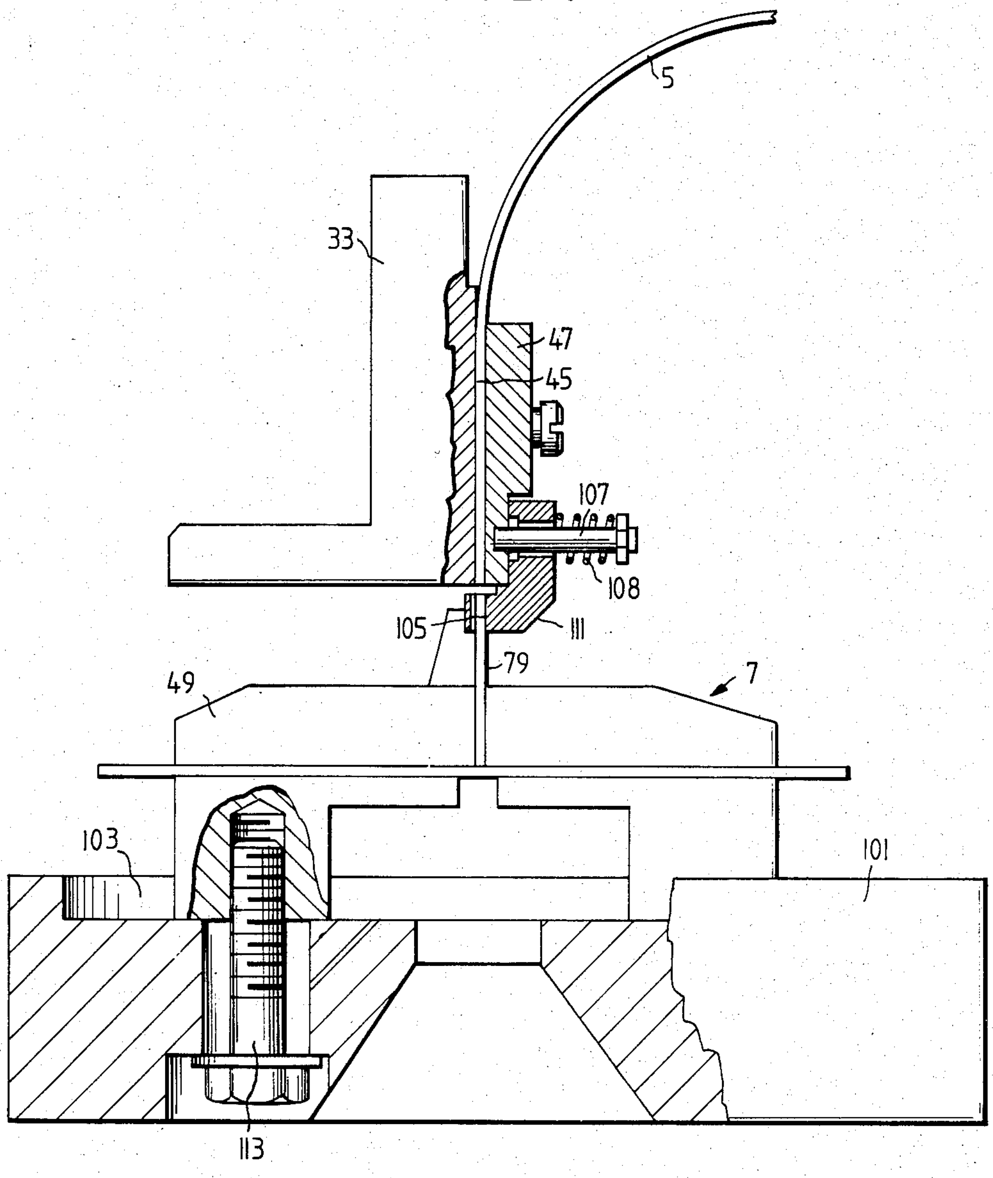
FIG. 7 is a schematic partial cross sectional view of another embodiment of a carrier and light coupling arrangement according to the invention.

FIG. 7 shows a further embodiment of the invention in which the light coupling rods 79 are fastened to the covering hoods 49 of light switching elements 7. It is also possible to homogenize the light strips provided by the flat cross section converters 5 in this manner. Carrier 33 here again includes a contact face 45 for the cross section converters 5 whose free ends can again be secured by means of a cover plate 47 fastened to the carrier 33 by means of bolts. The light switching elements 7 are mounted, in this embodiment on the upper surface of a traverse 101 (which itself is firmly connected to the carrier 33, e.g. by the end walls 29 and 31 of FIG. 2) so as to be displaceable and securable transversely to the line direction. For this purpose, traverse 101 is provided in its upper surface with guide grooves 103 for respective light switching elements 7. The light switching elements 7, together with the attached light coupling rods 79, are mounted in the grooves 103 to be displaceable until the rods 79 come in contact with a contact surface or edge 105 of carrier 33, which surface 105 extends in the line direction. In order to prevent damage to the light coupling rods 79 during this procedure, the contact edge 105 is provided on the carrier in a manner so that it yields to pressure. For this purpose, contact edge 105 is disposed on an abutment member 111 which is mounted on a guide bolt 107 secured to carrier 33 so as to be displaceable against the force of a spring 109. The light switching elements 7 are secured in the respective guide grooves 103 by means of bolts 113.

It will be understood that the above description of the present invention is susceptible to various modifications, changes and adaptations, and the same are intended to be comprehended within the meaning and range of equivalents of the appended claims.

What is claimed is:

1. In an optical printing head for a parallel printer for the line-by-line recording of graphics and text information in successive parallel lines on a photosensitive record carrier disposed at a print location, said printing head comprising a plurality of juxtaposed actuatable light switching means, each including a light switching array and being disposed adjacent one another in the direction of a recording line, for transmitting incident light in the form of dots along the length of a line to be recorded when actuated, a respective cross section converter for conducting light from a light source to each of said light switching means, and a respective objective lens for each said light switching means to project the dots of light produced by the light switching means onto the record carrier disposed at the printing location along a portion of each printing line; the improvement further comprising: a carrier on which said plurality of switching means are mounted and which is removably mounted in said printing head; an abutment surface on said carrier, with said abutment surface extending in the direction of a line of print; means for causing an edge portion of each of said light switching means to abut said abutment surface to align said light switching means on said carrier in the direction of the line of print; and a contact surface on said carrier for said cross section converters with said contact surface being disposed such that each said cross section converter, when in contact with said contact surface, can be placed in a defined position opposite said light switching array of the associated said light switching means.

2. Apparatus as defined in claim 1 wherein said light switching means include polarizing filters; and wherein the side of said carrier facing said light switching means is provided with a bar which projects in the line direction and whose end surface facing said light switching means is arranged in close proximity to said polarizing filters of said light switching means and whose two opposite side surfaces constitute said abutment surface for said light switching means and a contact surface for said cross section converters, respectively.

3. Apparatus as defined in claim 2, further comprising holding means for securing said cross section converters against said contact surface of said carrier.

4. Apparatus as defined in claim 3, wherein each said cross section converter is a light conductive fiber whose portion adjacent said carrier is flat; and wherein said holding means includes a cover plate which is fastened to said carrier and covers at least the ends of said flat portions of said cross section converters.

5. Apparatus as defined in claim 4, wherein: each of said light switching means includes a respective covering hood for its said light switching array, for its said polarizing filter, for its other electrical components; said covering hood is provided with an elongated opening above the respective said polarizing filter; and the ends of said bar and of said cover plate extend through said opening to permit said end surface of said bar to be in close proximity to said polarizing filters.

6. Apparatus as defined in claim 5 wherein the portion of said cover plate defining one side of said opening abuts said abutment surface of said carrier and constitutes the said edge portion of said light switching means.

7. Apparatus as defined in claim 6, wherein said carrier and said cover plate are each provided with a respective outwardly directed lateral flange having a respective abutment surface which engage respective mating counterabutment surface portions of said covering hoods, said flanges being disposed such that when said mating abutment and counterabutment surfaces are engaged, said end surface of said bar and the end surface of said cover plate cannot come into engagement with said polarizing filters.

8. Apparatus as defined in claim 7, wherein said means for causing includes respective means for releasably fastening said covering hoods to said lateral flange of said carrier so as to cause engagement of said mating abutment and counterabutment surfaces and to permit, when released, relative movement between a respective said light switching means and said carrier in a direction transverse to said line direction.

9. Apparatus as defined in claim 8, wherein each said means for releasably fastening includes a bolt which passes through an opening, which is elongated in a direction transverse to said line direction, formed in said lateral flange of said carrier, and is screwed into a bore in said counterabutment surface of the respective said covering hood.

10. Apparatus as defined in claim 5 wherein the end surfaces of said cross section converters are disposed in a common plane with said end surface of said bar and the end surface of said cover plate.

11. Apparatus as defined in claim 10, wherein said end surfaces of said cross section converters are disposed directly opposite their associated polarizing filters with a small space therebetween.

12. Apparatus as defined in claim 5 further comprising respective light coupling rods disposed between said end surfaces of said cross section converters and the respective said pole filters of said light switching means.

13. Apparatus as defined in claim 12, wherein each said light coupling rod is mounted in a pair of opposed recesses formed in said contact surface of said carrier and in the inner surface of said cover plate with said pair of recesses opening into said end surfaces of said bar and of said cover plate, respectively.

14. Apparatus as defined in claim 13 wherein: said pairs of recesses are wider, in the direction of the print line, that said light coupling rods; and means are provided for mounting said light coupling rods in said recesses so that they are displaceable in the direction of the print line.

15. Apparatus as defined in claim 14, wherein said means for mounting said light coupling rods includes a slot which is elongated in said line direction and extends through said cover plate opposite each said pair of recesses, and respective laterally extending pins which are secured to the respective said light coupling rods and project through the respective said slots, whereby said pins can be engaged by an adjustment device.

16. Apparatus as defined in claim 5 further comprising means for homogenizing the available light emitted by said cross-section converters including a respective cylindrical lens having an air-filled space on either side disposed between said end surface of each said cross-section converter and the associated said pole filter.

17. Apparatus as defined in claim 16, wherein said air-filled spaces are chambers which are worked into said contact surface of said carrier and into the inner surface of said cover plate.

18. Apparatus as defined in claim 17, wherein the interior surfaces defining said chambers are mirrored.

19. Apparatus as defined in claim 1 wherein: each said cross section converter is a light conductive fiber whose portion adjacent said contact surface is flat; and further comprising: means for securing at least the ends of said flat portion of said cross section converters against said contact surface such that the end surface of said cross section converters and the end surface of said carrier lie in a common plane which is disposed above said light switching means and transverse to the printing line direction; a respective covering hood for each of said light switching means; an elongated opening extending in the line direction in each said covering hood above the respective said light switching array; a respective flat light coupling rod secured to each said covering hood, projecting through the respective said opening and extending from a position adjacent said end surface of the respective said cross-section converter to a position adjacent the respective said light switching array so as to couple light from said cross-section converters to said light switching means; and a bar, which projects in said line direction, disposed on said carrier and having a side surface which is located below and perpendicular to said plane, said side surface abutting a side surface of said light coupling rods and constituting said abutment surface.

20. Apparatus as defined in claim 19 further comprising: a traverse connected to said carrier; means for mounting each said light switching means on said traverse so that it is displacable in a direction transverse to said line direction; and means for fastening each said light switching means in a desired position on said traverse.

21. Apparatus as defined in claim 20, wherein said means for mounting said light switching means on said traverse includes a guide groove for each of said light switching means which is formed in the surface of said traverse facing said carrier and in which said light switching means are disposed so that said light switching means together with said light coupling rods can be displaced until the abutment against said abutment surface of said the carrier is reached.

22. Apparatus as defined in claim 21, further comprising means for mounting said bar on said carrier so that said abutment surface is yieldable in a direction transverse to said line direction.

23. Apparatus as defined in claim 22, wherein said means for mounting said bar includes a plurality of guide bolts extending laterally from a side surface of said carrier; a respective spring disposed on each of said guide bolts; and means for supporting said bar on said guide bolts so that it is displaceable against the force of said springs.

* * * * *